(12) United States Patent
Alicherry et al.

(10) Patent No.: US 9,548,884 B2
(45) Date of Patent: Jan. 17, 2017

(54) METHOD AND APPARATUS FOR PROVIDING A UNIFIED RESOURCE VIEW OF MULTIPLE VIRTUAL MACHINES

(71) Applicant: ALCATEL-LUCENT, Paris (FR)

(72) Inventors: Mansoor A. Alicherry, Kerala (IN); Ashok Anand, Bangalore (IN); Shabon Preeth Chandrabose, Chennai (IN)

(73) Assignee: Alcatel Lucent, Boulogne-Billancourt (FR)

( * ) Notice: Subject to any disclaimer, the term of this patent is extended or adjusted under 35 U.S.C. 154(b) by 377 days.

(21) Appl. No.: 13/709,094

(22) Filed: Dec. 10, 2012

(65) Prior Publication Data

US 2014/0164618 A1 Jun. 12, 2014

(51) Int. Cl.
*G06F 15/173* (2006.01)
*H04L 29/08* (2006.01)
*G06F 9/50* (2006.01)

(52) U.S. Cl.
CPC ....... *H04L 29/08171* (2013.01); *G06F 9/5072* (2013.01); *G06F 9/5077* (2013.01)

(58) Field of Classification Search
CPC .. G06F 9/5072; G06F 9/5077; G06F 9/45533; G06F 9/455; G06F 9/5066; H04L 29/08171
See application file for complete search history.

(56) References Cited

U.S. PATENT DOCUMENTS 8,429,276 B1\* 4/2013 Kumar et al. ................ 709/226
8,667,207 B2\* 3/2014 Knowles et al. ............... 711/6
8,935,506 B1 1/2015 Gopalan
2013/0318525 A1\* 11/2013 Palanisamy et al. .......... 718/1
2014/0007097 A1\* 1/2014 Chin et al. ..................... 718/1

OTHER PUBLICATIONS

NPL, "Nswap: A Network Sawpping Module for Linux Clusters", Newhall et al., Euro-Par conference publication, Aug. 2003.*
"40Gb Ethernet NIC", by Mellanox, Press Release edited by StorageNewsletter.com, Sep. 22, 2009, http://www.storagenewsletter.com/news/connection/mellanox-40gb-ethernet-nic-card, 2 Pages.
"7z Format", 7-zip file archiver, http://www.7-zip.org/7z.html, 2 Pages.
Alcatel-Lucent CloudBandTM, http://bit.ly/CloudBand, 4 Pages.
Arista low-latency switches, http://www.aristanetworks.com/en/products/7100series, 1 Page.

(Continued)

*Primary Examiner* — Wing F Chan
*Assistant Examiner* — Padma Mundur
(74) *Attorney, Agent, or Firm* — Carl Bilicska; Niraj A. Desai

(57) ABSTRACT

Various embodiments provide a method and apparatus for dynamically allocating resources to processes by using unified resources. In particular, a superVM allows a process from an application to utilize resources (e.g., CPU, memory, and storage) from other VMs. Advantageously, sharing resources of of VMs that are operating below capacity increases cost efficiencies and providing resources without the overhead of spawning new VMs to VMs requiring additional resources increases application performance. Moreover, legacy applications may run utilize resources from multiple VMs without modification.

21 Claims, 7 Drawing Sheets

(56) References Cited

OTHER PUBLICATIONS

FFmpeg multimedia transcoder. http://www.ffmpeg.org., 24 Pages.
FRESHports, http://www.ffmpeg.org/multimedia/ffmpeg, 9 Pages.
IBM ILOG "CPLEX optimizer", http://www.ibm.com/software/integraion/optimization/cplexoptimizer, 2 Pages.
Nicira NVP, http://nicira.com/en/network-virtualization-platform, 4 Pages.
Open vSwitch. http://openvswitch.org, 2 Pages.
R for statistical computing. http://www.r-project.org, 3 Pages.
H. Ballani et al, "Towards predictable datacenter networks" In SIGCOMM, 2011 Aug. 15-19, 2011. Toronto, Ontario, Canada. pp. 242-253.
A. Barak, et al, "The MOSIX Distributed Operating System—Load Balancing for UNIX" vol. 672 of Lecture Notes in Computer Science. Springer, 1993, (Filed in four parts).
M. Chapman, et al, "vNUMA: A Virtual Shared-Memory Multiprocessor", In Usenix, 2009, 14 Pages.
S. Chen, et al, "Map-Reduce Meets Wider Varieties of Applications", Technical Report IRP-TR-00-05, Intel Lab Pittsburgh Tech Report, 2008, 8 Pages.
J. Dean. et al "MapReduce: Simplified data processing on large clusters", Communications of the ACM, vol. 51, No. 1, Jan. 2008< pp. 107-113.
U. Deshpande, et al, "MemX: Virtualization of Cluster-Wide Memory", In ICPP, 2010, pp. 663-672.
B. Hopkins, et al , "AoE (ATA over Ethernet)", 2006, 9 Pages.
M. Isard, et al, "Dryad: distributed data-parallel programs from sequential building blocks". ACM SIGOPS Operating Systems Review, Mar. 1, 2007,14 Pages.
C. Morin, et al, "Kerrighed and data parallelism: cluster computing on single system image operating systems", In Cluster, 2004, pp. 277-286.
T. Newhall, et al, "Nswap: A Network Swapping Module for Linux Clusters", In Euro-Par, 2003, LNCS 2790, Springer-Verlag Berlin Heidelberg, 2003, pp. 1160-1169.
Diagram "Nswap: A Network Swapping Module for Linux Clusters".
B. Pawlowski, et al, "NFS version 3: Design and Implementation", In Usenix, 1994, 15 Pages.
D. Wentzlaff, et al, "An operating system for multicore and clouds: mechanisms and implementation. In SoCC", pp. 3-14, 2010.

* cited by examiner

100

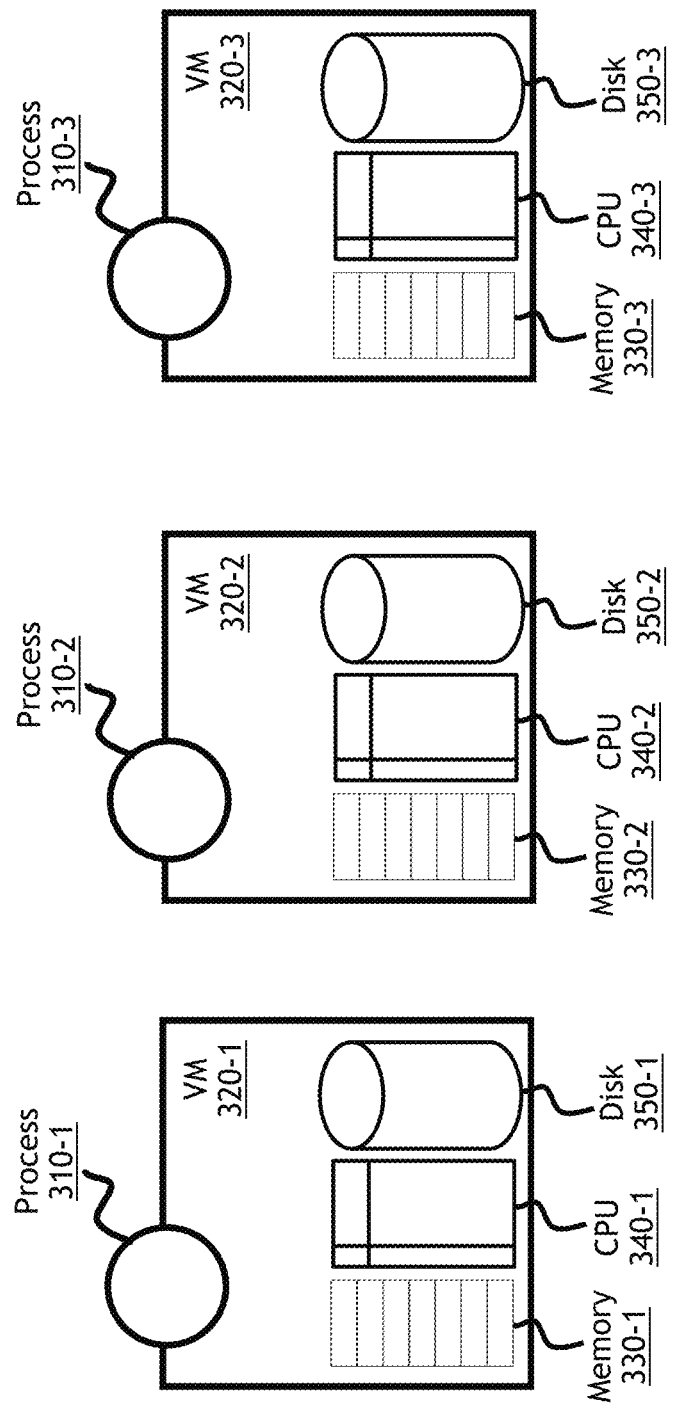

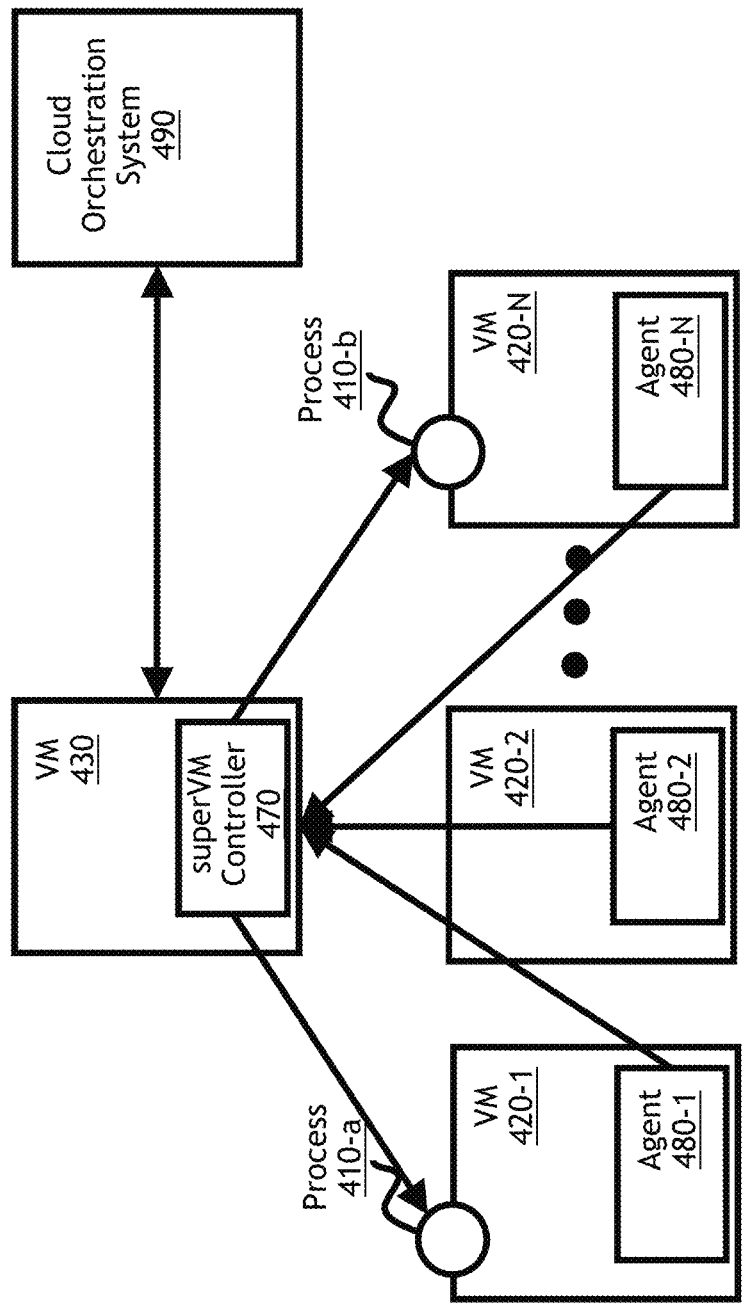

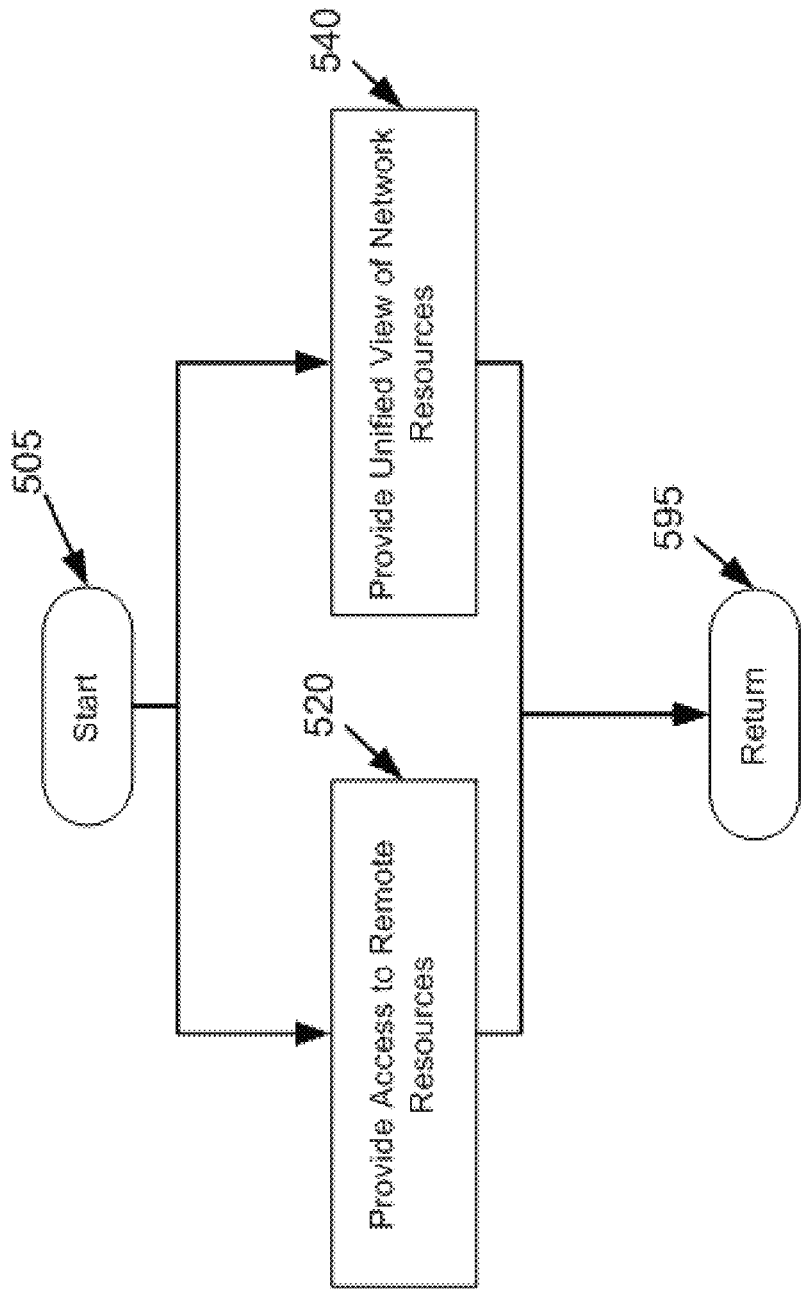

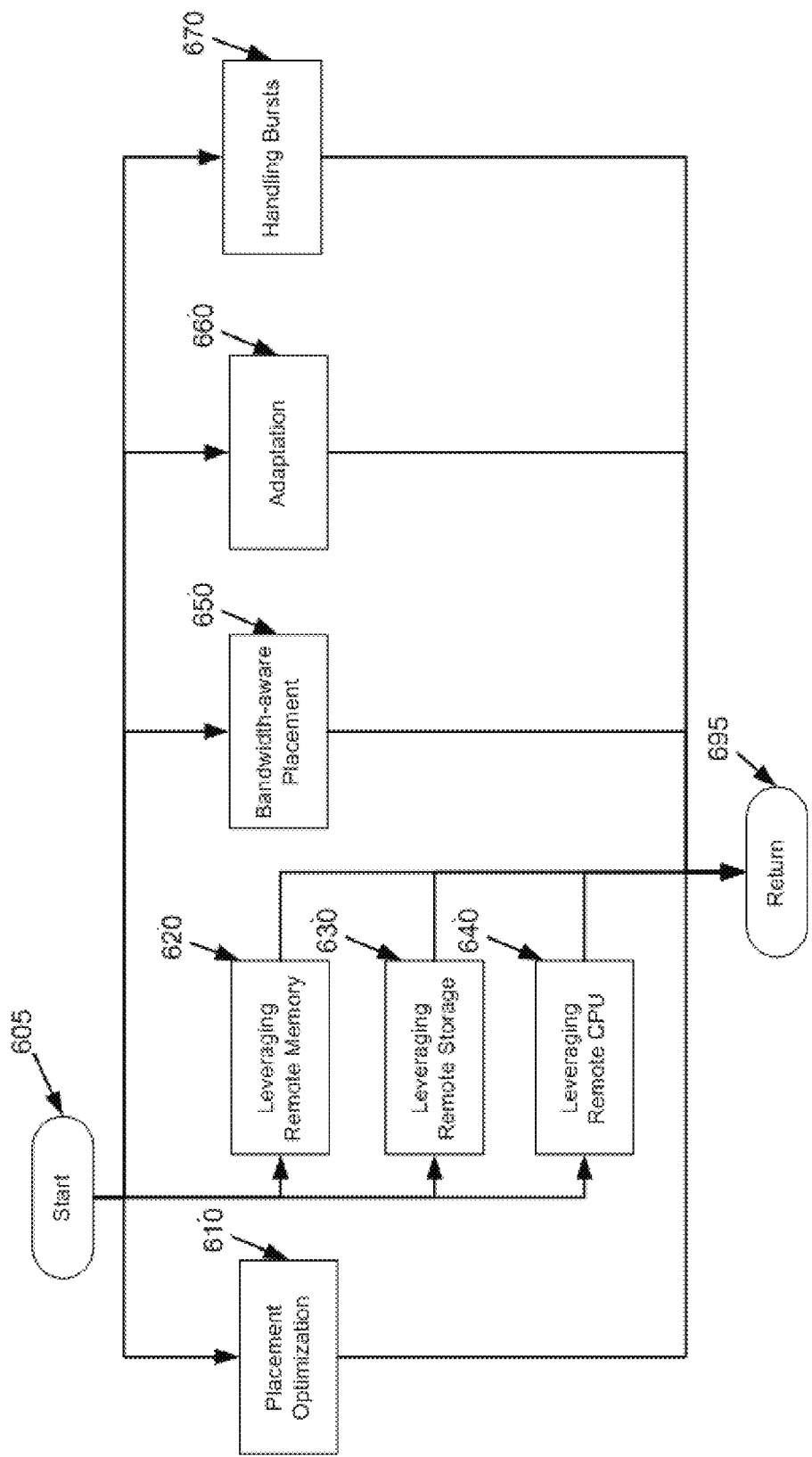

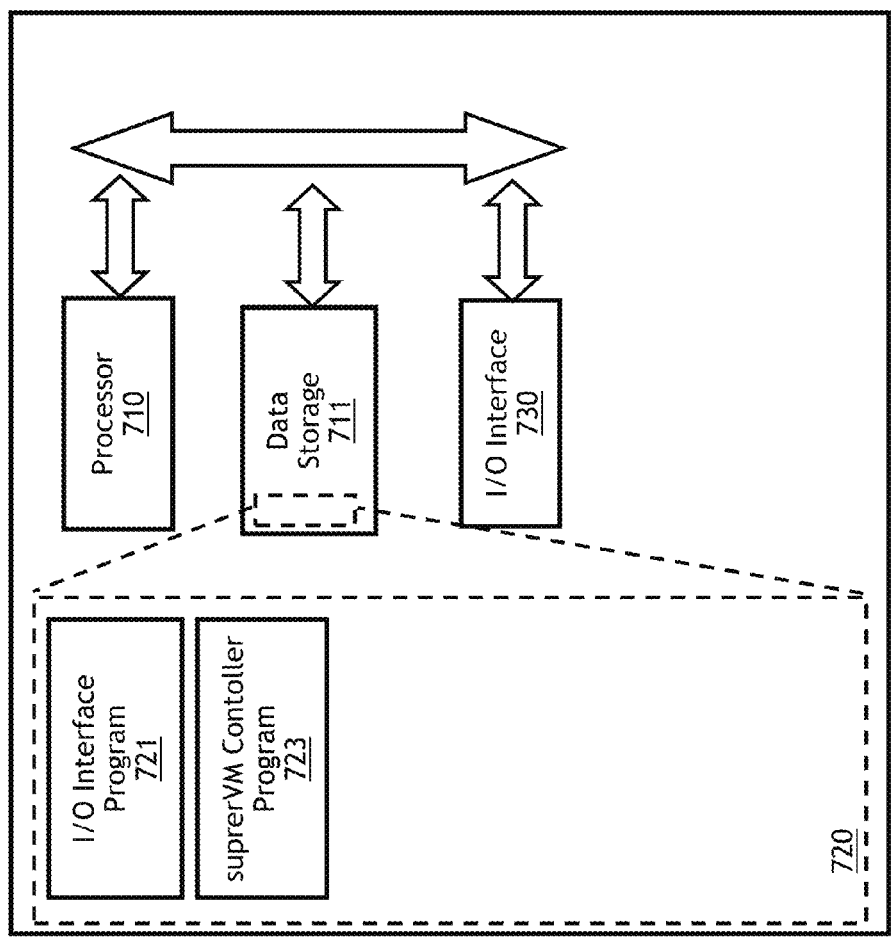

METHOD AND APPARATUS FOR PROVIDING A UNIFIED RESOURCE VIEW OF MULTIPLE VIRTUAL MACHINES

TECHNICAL FIELD

The invention relates generally to methods and apparatus for providing allocation of resources to application processes.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known IaaS (Infrastructure as a Service) cloud deployment models, the cloud providers provide infrastructure in the form of virtual machines (VMs), and the enterprises deploy their applications on top of them. In some of these models, as the demand of applications increase/decrease, enterprises add or remove VMs as appropriate.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the inventions. Detailed descriptions of a preferred exemplary embodiment adequate to allow those of ordinary skill in the art to make and use the inventive concepts will follow in later sections Various embodiments provide a method and apparatus for dynamically allocating resources to processes by using unified resources. In particular, a superVM allows a process from an application to utilize resources (e.g., CPU, memory, and storage) from other VMs.

In a first embodiment, an apparatus is provided for providing resource allocation to a plurality of processes. The apparatus includes a data storage and a processor communicatively connected to the data storage. The processor is programmed to: determine a collection of unified resources available in a plurality of virtual machines; determine a resource requirement of a first process associated with a first virtual machine, wherein the plurality of processes comprises the first process and the plurality of virtual machines comprises the first virtual machine; and assign a portion of a first resource to the first process based on the collection of unified resources and the resource requirement; wherein the first resource is assigned to a second virtual machine of the plurality of virtual machines and wherein the plurality of unified resources comprises the first resource.

In a second embodiment, a system is provided for providing resource allocation to a plurality of processes. The system includes a plurality of virtual machines, and a superVM controller. The superVM controller is programmed to: determine a collection of unified resources available in the plurality of virtual machines; determine a resource requirement of a first process associated with a first virtual machine, wherein the plurality of processes comprises the first process and the plurality of virtual machines comprises the first virtual machine; and assign a portion of a first resource to the first process based on the collection of unified resources and the resource requirement; wherein the first resource is assigned to a second virtual machine of the plurality of virtual machines and wherein the plurality of unified resources comprises the first resource.

In a third embodiment, a method is provided for providing resource allocation to a plurality of processes. The method includes: determining a collection of unified resources available in a plurality of virtual machines; determining a resource requirement of a first process associated with a first virtual machine, wherein the plurality of processes comprises the first process and the plurality of virtual machines comprises the first virtual machine; and assigning a portion of a first resource to the first process based on the collection of unified resources and the resource requirement. Where the first resource is assigned to a second virtual machine of the plurality of virtual machines and wherein the plurality of unified resources comprises the first resource.

In a fourth embodiment, a computer-readable storage medium is provided for storing instructions which, when executed by a computer, cause the computer to perform a method. The method includes: determining a collection of unified resources available in a plurality of virtual machines; determining a resource requirement of a first process associated with a first virtual machine, wherein the plurality of processes comprises the first process and the plurality of virtual machines comprises the first virtual machine; and assigning a portion of a first resource to the first process based on the collection of unified resources and the resource requirement; wherein the first resource is assigned to a second virtual machine of the plurality of virtual machines and wherein the plurality of unified resources comprises the first resource.

In some of the above embodiments, the determination of the collection of unified resources is performed at an operating system level.

In some of the above embodiments, the collection of unified resources includes a collection of unified memories comprising a first memory; and wherein the first resource is the first memory.

In some of the above embodiments, the processor is further configured to: determine a local memory utilization value; and further base the assignment of the portion of the first memory based on the local memory utilization value.

In some of the above embodiments, the processor is further configured to: determine a first rack location of the first process and a second rack location of the first memory; and further base the assignment of the portion of the first memory based on the first rack location and the second rack location.

In some of the above embodiments, the processor is further configured to: determine a resource cost; and further base the assignment of the portion of the first resource based on the resource cost.

In some of the above embodiments, the resource cost is based on a utilization cost of utilizing the portion of the first resource.

In some of the above embodiments, the processor is further configured to: determine a unified network view; and further base the assignment of the portion of the first resource based on the unified network view.

In some of the above embodiments, the determination of the unified network view comprises a network virtualization layer.

In some of the above embodiments, the processor is further configured to: determine a burst value; and further base the assignment of the portion of the first resource based on the burst value.

In some of the above system embodiments, each of a second plurality of the virtual machines comprises an agent configured to: determine a resource utilization view, and provide the resource utilization view to the superVM controller. Where the determination of the collection of unified resources available is based on the resource utilization view.

In some of the above method embodiments, the method further comprises: receiving a resource utilization view from the second virtual machine. Where the determination of the collection of unified resources available is based on the resource utilization view.

In some of the above method embodiments, the method further includes: transmitting a placement directive to a cloud orchestration system. Where the placement directive comprises at least one of virtual machine allocation, virtual machine removal or virtual machine re-assignment.

In some of the above method embodiments, the method further comprises: providing a network virtualization layer; and delivering a plurality of packets to the plurality of virtual machines based on the network virtualization layer.

In some of the above method embodiments, the step of delivering comprises load balancing.

In some of the above method embodiments, the method further includes: determining a unified network view; and further basing the assigning of the portion of the first resource based on the unified network view.

BRIEF DESCRIPTION OF THE DRAWINGS

Various embodiments are illustrated in the accompanying drawings, in which:

FIG. 3 depicts an exemplary deployment of virtual machines within the superVM 200 of FIG. 2;

FIG. 4 illustrates one embodiment of the superVM 200 of FIG. 2;

FIG. 5 depicts a flow chart illustrating an embodiment of a method 500 for a superVM controller (e.g., superVM controller 130 of FIG. 1) to leverage resources from multiple virtual machines (e.g., virtual machines 160 of FIG. 1);

FIG. 6 depicts a flow chart illustrating another embodiment of a method 600 for a superVM (e.g., superVM 130 of FIG. 1) to leverage resources from multiple virtual machines (e.g., virtual machines 160 of FIG. 1); and FIG. 7 schematically illustrates an embodiment of various apparatus 700 such as superVM controller 160 of FIG. 1.

To facilitate understanding, identical reference numerals have been used to designate elements having substantially the same or similar structure or substantially the same or similar function.

DETAILED DESCRIPTION OF ILLUSTRATIVE EMBODIMENTS

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

Various embodiments provide a method and apparatus for dynamically allocating resources to processes by using unified resources. In particular, a superVM allows a process from an application to utilize resources (e.g., CPU, memory, and storage) from other VMs. Advantageously, sharing resources of of VMs that are operating below capacity increases cost efficiencies and providing resources without the overhead of spawning new VMs to VMs requiring additional resources increases application performance. Moreover, legacy applications may utilize resources from multiple VMs without modification.

Figure 1:
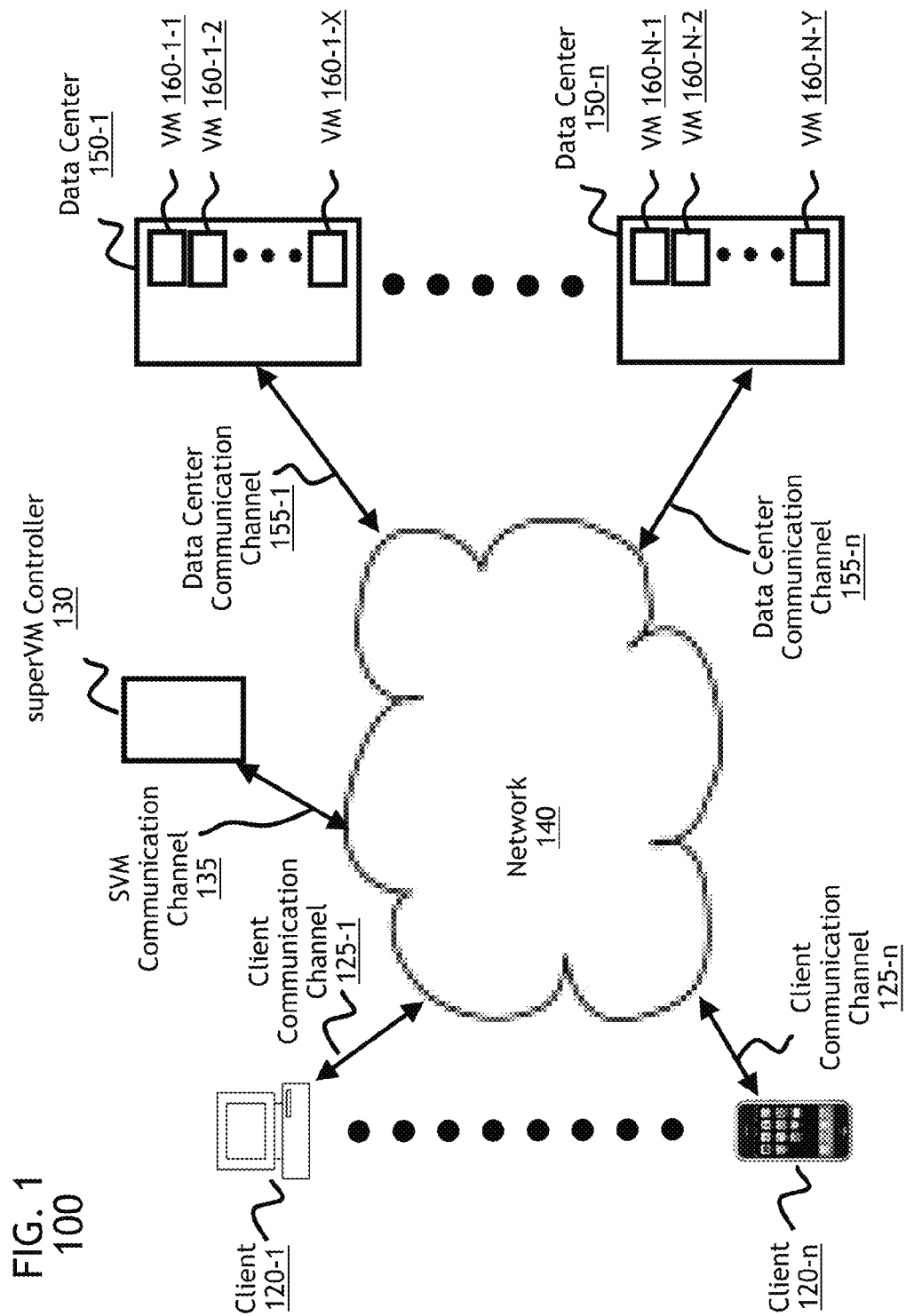
FIG. 1 illustrates a cloud network that includes an embodiment of a superVM system 100 for providing resource allocation.

FIG. 1 illustrates a cloud network that includes an embodiment of a superVM system 100 for providing resource allocation. The superVM system 100 includes one or more clients 120-1-120-n (collectively, clients 120) accessing one or more processes (not shown for clarity) residing in one or more virtual machines VM 160-1-1-VM 160-N-Y (virtual machines 160) in one or more data centers 150-1-150-n (collectively, data centers 150) over a communication path. The communication path includes an appropriate one of client communication channels 125-1-125-n (collectively, client communication channels 125), network 140, and one of data center communication channels 155-1-155-n (collectively, data center communication channels 155). Virtual machines providing resources to the application instances are allocated in one or more of data centers 150 by a superVM controller 130 communicating with the data centers 150 via a SVM communication channel 135, the network 140 and an appropriate one of data center communication channels 155.

Clients 120 may include any type of communication device(s) capable of sending or receiving information over network 140 via one or more of client communication channels 125. For example, a communication device may be a thin client, a smart phone (e.g., client 120-n), a personal or laptop computer (e.g., client 120-1), server, network device, tablet, television set-top box, media player or the like. Communication devices may rely on other resources within exemplary system to perform a portion of tasks, such as processing or storage, or may be capable of independently performing tasks. It should be appreciated that while two clients are illustrated here, system 100 may include fewer or more clients. Moreover, the number of clients at any one time may be dynamic as clients may be added or subtracted from the system at various times during operation.

The communication channels 125, 135 and 155 support communicating over one or more communication channels such as: wireless communications (e.g., LTE, GSM, CDMA, Bluetooth); WLAN communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, communication channels 125, 135 and 155 may be any number or combinations of communication channels.

SuperVM controller 130 may be any apparatus capable of placing new processes on virtual machines 160 in data centers 150 or re-assigning process to other virtual machines 160 based on resource usages. In particular, superVM manager 130 allocates processes based on a unified view of the resources. It should be appreciated that while only one cloud manager is illustrated here, system 100 may include more cloud managers.

The network 140 includes any number of access and edge nodes and network devices and any number and configuration of links. Moreover, it should be appreciated that network 140 may include any combination and any number of wireless, or wire line networks including: LTE, GSM, CDMA, Local Area Network(s) (LAN), Wireless Local Area Network(s) (WLAN), Wide Area Network (WAN), Metropolitan Area Network (MAN), or the like.

The data centers 150 include one or more virtual machines 160. Each of virtual machines 160 may include any types or configuration of resources and service any type or number or processes. Resources may be any suitable device utilized by a virtual machine to process requests from clients 120. For example, resources may be: servers, processor cores, memory devices, storage devices, networking devices or the like. In some embodiments, data centers 150 may be geographically distributed.

Figure 2:
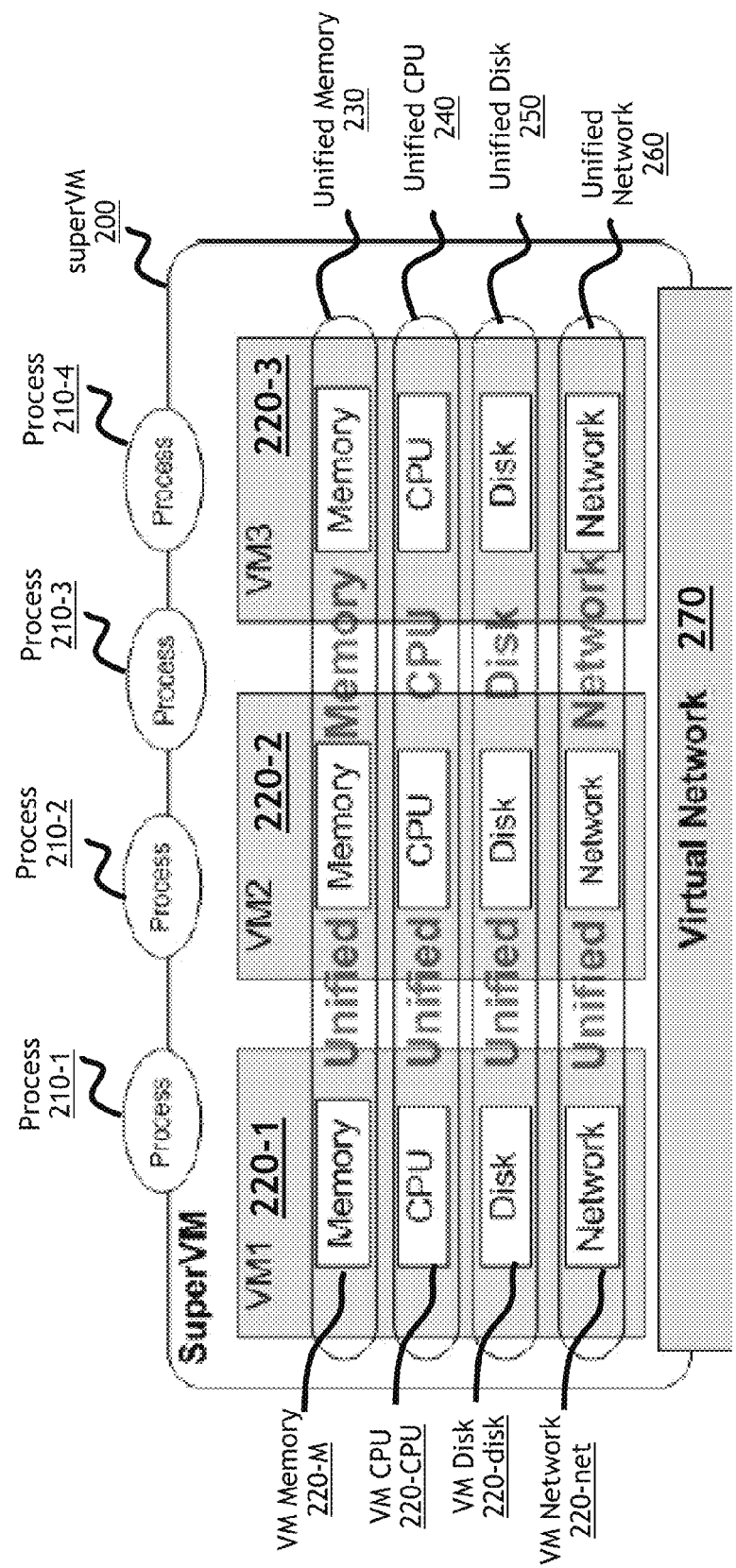
FIG. 2 illustrates a block diagram of an exemplary superVM 200.

FIG. 2 illustrates a block diagram of an exemplary superVM 200. SuperVM 200 provides a unified resource view for different VMs and provides a unified network view. The superVM 200 includes one or more virtual machines such as virtual machines VM1 220-1, VM2 220-2, and VM3 220-3 (collectively, virtual machines 220) which share one or more unified resources such as unified memory 230, unified CPU 240, unified disk 250 or unified network 260 (collectively, unified resources). The virtual machines 220 service one or more processes such as process 210-1-process 210-4 ((collectively, processes 210)).

In particular, superVM 200:

1) enables access for one of processes 210 running inside a VM to the unified resources, and 2) provides a unified network view (e.g., virtual network 270) for communications within and outside the superVM.

Unified resources include selected resources from participating virtual machines (e.g., selected ones of virtual machines 220) which are combined to create a logical view of available resources. In particular, one of processes 210 may request and be allocated portions of the unified resources. Advantageously, since the requesting process is capable of executing without code modification, the requesting process (e.g., a legacy application) may run unmodified, and still use resources from multiple virtual machines.

FIG. 3 depicts an exemplary deployment of virtual machines within the superVM 200 of FIG. 2. The exemplary deployment includes three virtual machines (i.e., virtual machines 320-1-320-3 (collectively, virtual machines 320)) each of which services a process (i.e., processes 310-1-310-3 (collectively, processes 310)). In this example, each of virtual machines 320 includes memory, CPU and disk (e.g., memory 330-1, CPU 340-1 and disk 350-1 for VM 320-1).

In an example, each of virtual machines 320 includes 1.7 GB memory, 1 compute unit and 160 GB storage and has an associated hourly price of $0.10 resulting in a net cost of $0.30 per hour. Additionally, the initial resource requirement of each of processes 310 is 0.8 compute unit and 1 GB memory.

In a first case of the example, process load on virtual machines 320 is 0.3 compute units and 0.5 GB of memory. In this case, a superVM controller (e.g., superVM 200 of FIG. 2) would have a unified view of virtual machines 320 and may determine that one virtual machine is sufficient to serve all three of processes 310 (total resource usage of 0.9 compute unit and 1.5 GB memory). In this case, processes 310 may be migrated to a single virtual machine (e.g., VM 320-1), and virtual machines VM 320-2 and 320-3 may be freed. It should be appreciated that by freeing virtual machines VM 320-2 and 320-3, a tenant may realize a cost reduction of approximately sixty six percent (66%).

In a second case of the example, process 310-1 requires an additional 0.4 GB of memory beyond the memory capability of memory 330-1 of virtual machine 320-1. In this case, a super VM controller may utilize unused memory portions of memory 330-2 or 330-3 to fulfill the additional memory requirement. Thus, the tenant may more efficiently utilize the contracted resources and not need to incur additional scaling costs. It should be appreciated that using remote memory may provide cost or performance benefits as compared to accessing local disks.

FIG. 4 illustrates one embodiment of the superVM 200 of FIG. 2. SuperVM architecture 400 includes a virtual machine 430, virtual machines 420-1-420-N (collectively, virtual machines 420) and optionally cloud orchestration system 490. Processes such as process 410 may be services by one or more of virtual machines 420 (illustratively process 410 is represented by process 410-*a* and 410-*b* which are respectively being serviced by VM 420-2 and VM 420-N).

Virtual machine 430 includes a superVM controller 470 and virtual machines 420 may include an agent such as agent 480-1. It should be appreciated that though virtual machine 430 is illustratively shown as separate from virtual machines 420, each of virtual machines 420 and 430 may include a superVM controller 470 or an agent and in some cases, ones of virtual machines 420 may include neither a superVM controller 470 or an agent.

SuperVM controller 470 manages processes being services by one or more of virtual machines 420 or 430. In particular, superVM controller 470 makes decisions of placing new processes on one or more of virtual machines 420 or 430, or re-assigning processes between ones of virtual machines 420 or 430 based on current resource usages within virtual machines 420 or 430. The superVM controller 470 may also optionally communicate with cloud orchestration system 490 to allocate new, remove or re-assign ones of virtual machines 420 or 430.

Agents 480-1-480-N (collectively, agents 480), are light weighted monitoring agents running on a plurality of virtual machines 420 that provide a resource utilization view to the superVM controller 470. The view may be provided using any suitable means such as: (i) periodically sent based on a predetermined threshold time; (ii) triggered based on a change in the resource utilization view (e.g., a resource utilization exceeding or falling below a threshold value); (iii) a response to a request from the superVM controller 470; or (iv) the like.

In some embodiments of superVM controller 470, superVM controller 470 may be deployed on an apparatus (e.g., superVM controller 130 of FIG. 1) outside of the one or more data centers (e.g., data centers 150 of FIG. 1) hosting virtual machines 420. For example, superVM controller 470 may be a program running on a network management system communicatively coupled to the data centers via a communication network (e.g., network 140 of FIG. 1).

In some embodiments of superVM controller 470, superVM controller 470 may be deployed on one or more of virtual machines 420.

In some embodiments of virtual machines 420, virtual machines 420 may be resident on more than one data center (e.g., two or more of data centers 150 of FIG. 1).

In some embodiments of one or more of agents 480, one or more of agents 480 periodically measure and report network latency and bandwidth to the superVM controller 470. In some of these embodiments, superVM controller 470 configures the assignment of network-intensive processes to different VMs based on changes in the available network bandwidth between VMs.

In some embodiments, superVM controller 470 or cloud orchestration system 490 places ones of virtual machines 420 or 430 in the same rack to leverage the use of unified resources (e.g., unified memory 230 of FIG. 2).

In some embodiments, superVM controller 470 receives bandwidth guarantees. In some of these embodiments, the superVM 470 makes placement decisions based on the received bandwidth guarantees.

FIG. 5 depicts a flow chart illustrating an embodiment of a method 500 for a superVM controller (e.g., superVM controller 130 of FIG. 1) to leverage resources from multiple virtual machines (e.g., virtual machines 160 of FIG. 1). The method includes: providing access to remote resources (step 520) and providing a unified view of network resources (step 540).

In the method 500, the step 520 includes providing access to remote resources. In particular, an apparatus performing the method provides unified view of the resources and grants access to remote resources. Access to remote resources may be provided in any suitable way such as: 1) at an operating system level; 2) at a hypervisor-level; or 3) at an application (or middleware) level.

In the method 500, the step 540 includes providing a unified view of the network for communications. In particular, communication between processes within the superVM system and between processes within the superVM system and the clients are based on a unified view of the network.

In some embodiments of step 520, a superVM accesses remote resources via an operating system configured to support unified resources. In a first of these embodiments, a conventional NFS (network file system) provides access to remote storage. In a second of these embodiments, the Linux loadable kernel module Nswap provides access to remote memory from any virtual machine. In a third of these embodiments, MOSIX is utilized to migrate processes between virtual machines to balance load across them.

In some embodiments of step 520, a superVM accesses remote resources via a hypervisor configured to support unified resources. In a first of these embodiments, MemX provides to access memory from remote virtual machines, by exposing remote memory as virtual block device to guest virtual machines. In a second of these embodiments, a hypervisor runs on each machine to manage physical resources.

In some embodiments of step 540, Open vSwitch (OVS) is extended to provide superVM network virtualization. In some of these embodiments, the network virtualization layer is made aware of the ports that are opened by an individual process within a virtual machine. The superVM controller may then be notified when a process is migrated to another virtual machine. In some of these embodiments, when a packet is addressed to a port in the superVM, the network virtualization layer delivers the packet to the right virtual machine. In some embodiments, the network virtualization layer also supports load balancing features. In some of these load balancing embodiments, multiple processes (e.g., webserver) running on multiple VMs using the same HTTP port are load balanced and when a client connects to the web server, the network virtualization layer forwards the packet to the right virtual machine.

In some embodiments of step 540, access to unified resources are based on system configuration. For example, if multiple threads of a process require synchronization on shared memory, running those processes over multiple VMs may have high inter-VM communication overhead, which may affect the performance and thus, co-locating those processes within a virtual machine may be advantageous. Similarly, if remote memory is allocated from a virtual machine in a different rack in the cloud data center, the memory bandwidth may not be sufficient due to oversubscribed inter-rack links in the data centers.

FIG. 6 depicts a flow chart illustrating another embodiment of a method 600 for a superVM (e.g., superVM 130 of FIG. 1) to leverage resources from multiple virtual machines (e.g., virtual machines 160 of FIG. 1). The method includes: optionally providing cost minimization (step 610); providing access to remote resources (e.g., step 520 of FIG. 5) by performing at least one of: leveraging remote memory (step 620), leveraging remote storage (step 630), or leveraging remote CPU (step 640); providing a unified network view (e.g., step 540 of FIG. 5) by performing bandwidth-aware placement (step 650); optionally providing adaptation (step 660); and optionally providing handling of bursts (step 670).

The method 600 optionally includes step 610. Step 610 includes placement optimization. In particular, placement optimization includes basing decisions of the superVM controller as a function of one or more placement parameters. Placement parameters may include any suitable parameters such as: (i) the amount of resources required by the virtual machines; (ii) the costs of utilizing the required resources; (iii) quality of service parameters such as latency; or (iv) the like.

In the method 600, the step 620 includes leveraging remote memory. In particular, remote memory is leveraged when the inter-VM latency is low and bandwidth is high (e.g., VMs in same rack). It should be appreciated that performance of a process may be adversely affected if most of the memory it accesses is remote memory. Hence, the system may ensure that a process gets a threshold fraction of memory locally.

In the method 600, the step 630 includes leveraging remote storage. In particular, remote storage is leveraged when there is not enough local storage in the VM to run the application.

In the method 600, the step 640 includes leveraging remote CPU. In particular, remote CPU is leveraged when the local CPU is not sufficient for running the application. It could also be leveraged when there is high CPU intensive subtask of the application that can be processed on the remote CPU.

In the method 600, the step 650 includes bandwidth-aware placement. In particular, network-intensive processes are placed in bandwidth-aware fashion to attempt to avoid creating network bottlenecks. In some of these embodiments, step 65 includes learning process bandwidth demands over time, or receiving bandwidth demand parameters. In some embodiments, as the available bandwidth changes, the system adapts to those changes by moving processes accordingly.

The method 600 optionally includes step 660. Step 660 includes the adaptation. In particular, adaptation may include addition or removal of VMs and migration of processes from one VM to another as resource demands grow or shrink.

The method 600 optionally includes step 670. Step 670 includes the handling bursts. In particular, handling bursts may include moving processes across virtual machines or using unified resources (e.g., unified memory) when process demand growth exceeds a threshold over a period of time. In some of these embodiments, the superVM is configured to place processes within the virtual machines based on preserving a threshold of available capacity in one or more virtual machines. It should be appreciated that the available capacity may be utilized to handle bursts. In some of these embodiments, the superVM is configurable to tune the available capacity threshold(s) for one or more virtual machines. It should be appreciated that by tuning the available capacity, selection may be made between cost-efficiency and capability to handle bursts. In some of these embodiments, different virtual machines may be configured differently. Further to this embodiment, the configuration may be automated based on any suitable factor such as: (i) service level agreements; (ii) application classifications; or (iii) the like.

In some embodiments, the method 500 or 600 includes solving a linear programming problem using conventional classical optimization techniques. Conventional classical optimization techniques involve determining the action that best achieves a desired goal or objective. An action that best achieves a goal or objective may be determined by maximizing or minimizing the value of an objective function. In some embodiments, the goal or metric of the objective function may be to minimize the maximum link utilization.

The problem may be represented as:
Optimizing:

$$y = f(x_1, x_2, \ldots, x_n) \quad [\text{Eq. 1}]$$

Subject to:

$$G_j(x_1, x_2, \ldots, x_n) \begin{Bmatrix} \leq \\ = \\ \geq \end{Bmatrix} b_j \quad [\text{Eq. 2}]$$

$$j = 1, 2, \ldots m$$

Where the equation Eq.1 is the objective function and equation Eq.2 constitutes the set of constraints imposed on the solution. The $x_i$ variables, $x_1, x_2, \ldots, x_n$, represent the set of decision variables and $y = f(x_1, x_2, \ldots, x_n)$ is the objective function expressed in terms of these decision variables. It should be appreciated that the objective function may be maximized or minimized.

In some of these embodiments, the linear programming problem is an integer linear program (ILP) formulation for the resource allocation that optimizes cost, by careful exploitation of remote memory.

In some of these embodiments, the ILP formulation may include the following formulation: Let $P_1, P_2, \ldots, P_p$ be the set P of processes and let $M_1; M_2; \ldots, M_K$ be the set of K VMs. We want to allocate the processes to VMs, so as to optimize cost. Let the binary variable $x_{i,j}$ be 1 if the process $P_i$ is assigned to the VM $M_j$. It should be appreciated that not all VMs may be allocated. Variable $u_j$ represents whether VM $M_j$ is used in assignment; i.e. $u_j = \max_i(x_{i,j})$.

Our objective is to minimize the cost, i.e., $$\text{Minimize} \sum_j \text{cost}_j \times u_j, \text{ where cost}_j \text{ is cost for VM } M_j; \quad [\text{Eq. 3}]$$

In this embodiment, we use the following constraints.
1. Each process should be assigned to only one VM, $$\sum_i x_{i,j} = 1 \text{ for all } i = 1 \ldots P. \quad [\text{Eq. 4}]$$

2. Each VM should be able to handle the CPU load of all the processes assigned to it.

$$\sum_i x_{i,j} \times pCPU_i \leq CPU_j \text{ for all } j = 1 \ldots K. \quad [\text{Eq. 5}]$$

where $CPU_j$ is number of CPU in VM $M_j$ and $pCPU_i$ represents the CPU requirements of process $P_i$.
3. Each process should be allocated their memory required. Let say $m_{i,j}$ represents the fraction of memory assigned for process Pi from VM $M_j$. So, $$\sum_j m_{i,j} = 1 \text{ for all } i = 1 \ldots P. \quad [\text{Eq. 6}]$$

In addition, $m_{i,j} \leq u_j$, since memory should be used from a VM that is used in assignment. Furthermore, each process $P_i$ should use at least certain fraction, i, of memory locally. Hence, we have, $m_{i,j} \geq \alpha_i \times x_{i,j}$.

4. Each VM should be able to handle the memory load assigned to it.

$$\sum_i m_{i,j} \times pMEM_i \leq MEM_j \text{ for all } j = 1 \ldots K. \quad [\text{Eq. 7}]$$

where $MEM_j$ is memory for VM $M_j$ and $pMEM_i$ represents the memory requirements of process $P_i$.
5. We allow process to use remote memory, but within the same rack. So, $$\sum_{j \in Rack: r} m_{i,j} = \sum_{j \in Rack: r} x_{i,j} \text{ for all } j = 1 \ldots K. \quad [\text{Eq. 8}]$$

i.e., if a process is assigned in one of the VMs in a rack, then other VMs in the rack may be used for remote memory. It should be appreciated that in some embodiments memory from other racks may be used. In some of these embodiments, the eligibility of memory to be used may be based on a threshold value such as an estimated inter-rack latency.

In a simulation of the ILP algorithm of Eqs. 3-8, 25 application profiles were generated using a mix of memory-intensive and CPU-intensive applications. The observed reduction of virtual machines is given below in table 1 where α indicates the fraction of memory assigned locally to the application.

TABLE 1

Efficient Packing of applications to fewer VMs

| Local Memory Fraction (α) | Number of virtual machines | |
|---|---|---|
| | Full Load | Half Load |
| 0.5 | 17 | 9 |
| 0.75 | 18 | 9 |
| 0.9 | 22 | 9 |
| 1.0 | 24 | 10 |

In some embodiments, the method 500 or 600 includes using:
1. MOSIX to provide a unified CPU view and assigning/migrating processes to virtual machines based on the load;
2. ATA over Ethernet to expose unified memory as a swap device and to access unified memory locally.

In a study of this embodiment, placement optimizations and similar performances were observed.

Although primarily depicted and described in a particular sequence, it should be appreciated that the steps shown in methods 500 and 600 may be performed in any suitable sequence. Moreover, the steps identified by one step may also be performed in one or more other steps in the sequence or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

FIG. 7 schematically illustrates an embodiment of various apparatus 700 such as superVM controller 160 of FIG. 1. The apparatus 700 includes a processor 710, a data storage 711, and an I/O interface 730.

The processor 710 controls the operation of the apparatus 700. The processor 710 cooperates with the data storage 711.

The data storage 711 stores programs 720 executable by the processor 710. Data storage 711 may also optionally store program data such as service level guarantees, or the like as appropriate.

The processor-executable programs 720 may include an I/O interface program 721, or a superVM controller program 723. Processor 710 cooperates with processor-executable programs 720.

The I/O interface 730 cooperates with processor 710 and I/O interface program 721 to support communications over SVM communication channel 135 of FIG. 1 as described above.

The superVM controller program 723 performs the steps of method(s) 500 of FIG. 5 or 600 of FIG. 6 as described above.

In some embodiments, the processor 710 may include resources such as processors/CPU cores, the I/O interface 730 may include any suitable network interfaces, or the data storage 711 may include memory or storage devices. Moreover the apparatus 700 may be any suitable physical hardware configuration such as: one or more server(s), blades consisting of components such as processor, memory, network interfaces or storage devices. In some of these embodiments, the apparatus 700 may include cloud network resources that are remote from each other.

In some embodiments, the apparatus 700 may be virtual machine. In some of these embodiments, the virtual machine may include components from different machines or be geographically dispersed. For example, the data storage 711 and the processor 710 may be in two different physical machines.

When processor-executable programs 720 are implemented on a processor 710, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for providing resource allocation to a plurality of processes, the apparatus comprising:
   a data storage; and
   a processor communicatively connected to the data storage, the processor being configured to:
   determine a collection of unified resources available to a plurality of virtual machines, wherein the plurality of virtual machines are distributed across a plurality of racks and the collection of unified resources are distributed across at least two of the plurality of racks;
   determine a resource requirement of a first process associated with a first virtual machine of the plurality of virtual machines, the first virtual machine being located in a first rack of the plurality of racks;
   determine an inter-rack latency between the first rack and a second rack of the plurality of racks;
   assign a first portion of a first resource of the collection of resources to the first process, the first resource being located in the first rack of the plurality of racks; and,
   assign a second portion of the first resource to a second process of a second virtual machine of the plurality of virtual machines, the second virtual machine being located in the second rack of the plurality of racks;
   wherein the first and second portions of the first resource are assigned based on the determined resource requirement and the determined inter-rack latency.

2. The apparatus of claim 1, wherein the determination of the collection of unified resources is performed at an operating system level.

3. The apparatus of claim 1, wherein the first resource of the collection of unified resources is a memory.

4. The apparatus of claim 3, wherein the processor is further configured to:
   determine a local memory utilization value; and
   further base the assignment of the first or second portion of the first resource based on the local memory utilization value.

5. The apparatus of claim 1, wherein the processor is further configured to:
   determine a resource cost; and
   further base the assignment of the first or second portion of the first resource based on the resource cost.

6. The apparatus of claim 5, wherein the resource cost is based on a utilization cost of utilizing the first or second portion of the first resource.

7. The apparatus of claim 1, wherein the processor is further configured to:
   determine a unified network view; and
   further base the assignment of the first or second portion of the first resource based on the unified network view.

8. The apparatus of claim 7, wherein the determination of the unified network view comprises a network virtualization layer.

9. The apparatus of claim 1, wherein the processor is further configured to:
   determine a burst value; and
   further base the assignment of the first or second portion of the first resource based on the burst value.

10. A system for providing resource allocation to a plurality of processes, the system comprising:
    a plurality of virtual machines; and
    a superVM controller, the superVM controller comprising a processor communicatively connected to a data storage and being configured to:
    determine a collection of unified resources available to a plurality of virtual machines, wherein the plurality of virtual machines are distributed across a plurality of racks and the collection of unified resources are distributed across at least two of the plurality of racks;
    determine a resource requirement of a first process associated with a first virtual machine of the plurality of virtual machines, the first virtual machine being located in a first rack of the plurality of racks;
    determine an inter-rack latency between the first rack and a second rack of the plurality of racks;
    assign a first portion of a first resource of the collection of unified resources to the first process, the first resource being located in the first rack of the plurality of racks; and,
    assign a second portion of the first resource to a second process of a second virtual machine of the plurality of virtual machines, the second virtual machine being located in the second rack of the plurality of racks;
    wherein the first and second portions of the first resource are assigned based on the determined resource requirement and the determined inter-rack latency.

11. The system of claim 10, wherein each of a second plurality of the virtual machines are configured to:
    determine a resource utilization view; and
    provide the resource utilization view to the superVM controller;
    wherein the determination of the collection of unified resources available is based on the resource utilization view.

12. A method for providing resource allocation to a plurality of processes, the method comprising:
    at a processor communicatively connected to a data storage, determining a collection of unified resources available to a plurality of virtual machines, wherein the plurality of virtual machines are distributed across a plurality of racks and the collection of unified resources are distributed across at least two of the plurality of racks;
    determining, by the processor in cooperation with the data storage, a resource requirement of a first process associated with a first virtual machine of the plurality of virtual machines, the first virtual machine being located in a first rack of the plurality of racks;
    determining, by the processor in cooperation with the data storage, an inter-rack latency between the first rack and a second rack of the plurality of racks;
    assigning, by the processor in cooperation with the data storage, a first portion of a first resource of the collection of unified resources to the first process, the first resource being located in the first rack of the plurality of racks; and,
    assigning a second portion of the first resource to a second process of a second virtual machine of the plurality of virtual machines, the second virtual machine being located in the second rack of the plurality of racks;
    wherein the first and second portions of the first resource are assigned based on the determined resource requirement and the determined inter-rack latency.

13. The method of claim 12, wherein the method further comprises:
    receiving, by the processor in cooperation with the data storage, a resource utilization view from the second virtual machine; and
    wherein the determination of the collection of unified resources available is based on the resource utilization view.

14. The method of claim 13, wherein the resource utilization view comprises at least one of a network latency value and a network bandwidth value.

15. The method of claim 12, wherein the method further comprises:
transmitting, by the processor in cooperation with the data storage, a placement directive to a cloud orchestration system;
wherein the placement directive comprises at least one of virtual machine allocation, virtual machine removal or virtual machine re-assignment.

16. The method of claim 12, wherein the method further comprises:
providing, by the processor in cooperation with the data storage, a network virtualization layer; and
delivering, by the processor in cooperation with the data storage, a plurality of packets to the plurality of virtual machines based on the network virtualization layer.

17. The method of claim 16, wherein the step of delivering comprises load balancing.

18. The method of claim 12, wherein the method further comprises:
determining, by the processor in cooperation with the data storage, a unified network view; and
further basing the assigning of the first or second portion of the first resource based on the unified network view.

19. A non-transitory computer-readable storage medium storing instructions which, when executed by a computer, cause the computer to perform a method, the method comprising:
determining a collection of unified resources available to a plurality of virtual machines, wherein the plurality of virtual machines are distributed across a plurality of racks and the collection of unified resources are distributed across at least two of the plurality of racks;
determining a resource requirement of a first process associated with a first virtual machine, the first virtual machine being located in a first rack of the plurality of racks;
determining an inter-rack latency between the first rack and a second rack of the plurality or racks;
assigning a first portion of a first resource of the collection of unified resources to the first process, the first resource being located in the first rack of the plurality of racks; and,
assigning a second portion of the first resource to a second process of a second virtual machine of the plurality of virtual machines, the second virtual machine being located in the second rack of the plurality of racks;
wherein the first and second portions of the first resource are assigned based on the determined resource requirement and the determined inter-rack latency.

20. The apparatus of claim 1, wherein the processor is further configured to remove the assignment of the first portion of the first resource assigned to the first process of the first virtual machine while the second portion of the first resource remains assigned to the second process of the second virtual machine.

21. The apparatus of claim 3, wherein processor is further configured to assign a remote memory to the first process of the first virtual machine based on the resource requirement of the first process.

* * * * *